Patented July 19, 1932

1,867,937

UNITED STATES PATENT OFFICE

GÉRALD BONHÔTE, OF BASEL, SWITZERLAND, ASSIGNOR TO SOCIETE OF CHEMICAL INDUSTRY IN BASLE, OF BASEL, SWITZERLAND

STABLE DIAZO PREPARATIONS AND PROCESS OF MAKING SAME

No Drawing. Application filed November 10, 1927, Serial No. 232,482, and in Switzerland November 18, 1926.

The present invention relates to the manufacture of stable diazo preparations. It comprises the process of making these preparations as well as the preparations themselves.

It has been found that valuable stable diazo preparations are obtained by mixing the diazonium chlorides of such amines which contain as many amino groups as aromatic nuclei and in which every aromatic nucleus carries one amino group, such as, for example, aniline or dianisidine, with a salt of a naphthalene trisulfonic acid in the proportion of at the most two

residues to three SO₃-Me-residues, and evaporating the mixture thus obtained to dryness.

The invention has the advantage over processes which depend on the separation of the diazo-compound that the yield is always substantially quantitative; moreover, the operation consisting in a mere evaporation of the liquid is the most simple that one can imagine.

The diazo-preparations thus obtained dissolve in water with a definite mineral acid reaction. This is owing to the fact, as has been ascertained, that the tri-alkali salts of the naphthalene trisulfonic acids when treated and evaporated according to the disclosed conditions are converted into products which now behave like the salts of naphthalene trisulfonic acid in which a free SO₃H-group is present. They thus correspond with the general formula

wherein R₁ stands for the naphthalene nucleus, R₂ for the residue of the diazo-compound used, and R₃ for an alkali metal atom or for a residue which is identical with the residue R₂. It is therefore advantageous in certain cases, particularly when the diazo-compound has no negative substituent, to introduce into the dried preparation an agent which binds acid, such as a bicarbonate, borax, phosphate or chalk.

The following examples illustrate the invention, the parts being by weight:

Example 1

123 parts of ortho-anisidine are diazotized in the usual manner. The acid diazonium chloride solution is mixed with 434 parts of sodium naphthalene trisulfonate, stirred until the whole is dissolved and filtered from any impurities. The filtrate is then cautiously evaporated in a vacuum, advantageously on a drying cylinder. There is thus obtained a brownish powder which, particularly when mixed with a little sodium bicarbonate, dissolves in water to form a diazo-solution which is easily coupled.

The new compound behaves like a product of the formula:

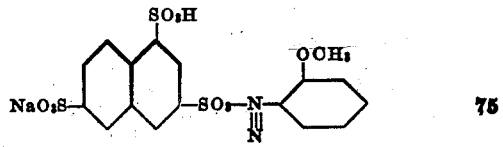

A similar result is obtained with other naphthalene trisulfonates, such as the sodium or potassium salts of the 1:3:5- or 1:3:7- naphthalene trisulfonic acids, or with mixtures of these salts.

Example 2

Into a diazonium chloride solution made from 167.5 parts of 4-chloro-ortho-anisidine 286 parts of sodium naphthalene trisulfonate are introduced. When dissolution has occurred the solution is filtered, if necessary, and dried in a vacuum.

The new compound behaves like a mixture of the following compounds:

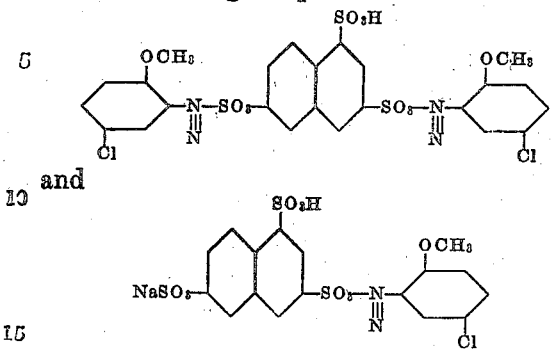

and

*Example 3*

To a diazonium chloride solution made from 172.5 parts of 4-chloro-2-nitraniline 434 parts of sodium naphthalene trisulfonate are added and the mixture is stirred until the salt is dissolved. The diazo-solution, filtered if necessary, is then evaporated to dryness in a vacuum. The yellow powder thus obtained dissolves immediately in water to form a diazo-solution ready for use. The formula of the new compound very probably corresponds to that of the product of Example 1.

In like manner widely different diazo-compounds can be treated, for example those from aniline, toluidine, the several chloro-toluidines, for instance 5- and 4-chloro-2-toluidine, chloranilines, such as ortho-, para- and meta-chloraniline or 2:5-dichloraniline, ortho-phenetidine, nitranilines and the like, such as ortho-, para- and meta-nitraniline, 5- and 4-nitro-ortho-anisidine, meta-nitro-para-toluidine, para-nitro-ortho-toluidine and other numerous diazo-compounds or tetrazo-compounds, such as tetrazo diphenyl, tetrazotized dianisidine or azoxy aniline, which are suitable for producing ice colors. The preparations which derive from tetrazo-compounds have as a rule a darker shade than those which derive from the simple diazo-compounds. The amount of the salt of naphthalene trisulfonic acid added may be varied within wide limits. Before the drying operation a diluent or fixing agent, such as common salt, sodium sulfate or aluminium sulfate, may be added to the diazo-solution.

What I claim is:—

1. The manufacture of new dry diazo-preparations, consisting in adding to aqueous solutions of diazonium chlorides of such aromatic amines which contain as many amino groups as aromatic nuclei and in which every aromatic nucleus carries one amino group, alkali salts of naphthalene trisulfonic acids in the proportion of at the most two $$-\underset{N}{\overset{N}{\underset{\|}{\|}}}-$$

residues to three $SO_3$-Me-residues, and evaporating the mixture to dryness.

2. The manufacture of new dry diazo-preparations, consisting in adding to aqueous solutions of diazonium chlorides of such aromatic amines which contain as many amino groups as aromatic nuclei and in which every aromatic nucleus carries one amino group alkali salts of naphthalene trisulfonic acids in the proportion of at the most two $$-\underset{N}{\overset{N}{\underset{\|}{\|}}}-$$

residues to three $SO_3$-Me-residues, evaporating the mixture to dryness, and introducing into the dried preparation a water-soluble substance capable of binding acids as described.

3. The manufacture of new dry diazo-preparations, consisting in adding to aqueous solutions of diazonium chlorides of such aromatic amines which contain as many amino groups as aromatic nuclei and in which every aromatic nucleus carries one amino group, and which further contain one substituent in ortho-position to this amino-group, alkali salts of naphthalene trisulfonic acids in the proportion of at the most two $$-\underset{N}{\overset{N}{\underset{\|}{\|}}}-$$

residues to three $SO_3$-Me-residues, and evaporating the mixture to dryness.

4. The manufacture of new dry diazo-preparations, consisting in adding to aqueous solutions of diazonium chlorides of such aromatic amines which contain as many amino groups as aromatic nuclei and in which every aromatic nucleus carries one amino group, and which further contain one substituent in ortho-position to this amino-group, alkali salts of naphthalene trisulfonic acids in the proportion of at the most two $$-\underset{N}{\overset{N}{\underset{\|}{\|}}}-$$

residues to three $SO_3$ Me-residues, evaporating the mixture to dryness, and introducing into the dried preparation a water-soluble substance capable of binding acids as described.

5. The manufacture of new dry diazo-preparations, consisting in adding to aqueous solutions of one molecule of the hydro-chloride of a diazotized aromatic mono-amine which contains one substituent in ortho-position to the amino-group, one molecule of alkali salts of naphthalene trisulfonic acids, and evaporating the mixture to dryness.

6. The manufacture of new dry diazo-preparations, consisting in adding to aqueous solutions of one molecule of the hydro-chloride of a diazotized aromatic mono-amine which contains one substituent in ortho-position to the amino-group, one molecule of alkali salts of naphthalene trisulfonic acids, evaporating the mixture to dryness, and introducing into the dried preparation a water-soluble substance capable of binding acids as described.

7. As new products the dry diazo-preparations corresponding with the general formula $$\begin{array}{c} SO_2-R_3 \\ R_1-SO_3H \\ SO_2-R_3 \end{array}$$

wherein $R_1$ stands for the naphthalene nucleus, $R_2$ for the residue of an aromatic diazo-compound, and $R_3$ for an alkali metal atom or for a residue which is identical with the residue $R_2$, which products form feebly colored to dark powders, dissolving in water with an acid reaction and directly reacting with the usual coupling components of azo-dyestuffs.

8. As new products a mixture of the dry diazo-preparations corresponding with the general formula $$\begin{array}{c} SO_2-R_3 \\ R_1-SO_3H \\ SO_2-R_3 \end{array}$$

wherein $R_1$ stands for the naphthalene nucleus, $R_2$ for the residue of an aromatic diazo-compound, and $R_3$ for an alkali metal atom or for a residue which is identical with the residue $R_2$, with a water-soluble substance capable of binding acids, which products form feebly colored to dark powders, dissolving in water with an acid reaction and directly reacting with the usual coupling components of azo-dyestuffs.

9. As new products the dry diazo-preparations corresponding with the general formula $$\begin{array}{c} SO_2-R_3 \\ R_1-SO_3H \\ SO_2-R_3 \end{array}$$

wherein $R_1$ stands for the naphthalene nucleus, $R_2$ for the residue of an aromatic diazo-compound containing one substituent in ortho-position to the diazo-group, and $R_3$ for an alkali metal atom or for a residue which is identical with the residue $R_2$, which products form feebly colored to dark powders, dissolving in water with an acid reaction and directly reacting with the usual coupling components of azo-dyestuffs.

10. As new products a mixture of the dry diazo-preparations corresponding with the general formula $$\begin{array}{c} SO_2-R_3 \\ R_1-SO_3H \\ SO_2-R_3 \end{array}$$

wherein $R_1$ stands for the naphthalene nucleus, $R_2$ for the residue of an aromatic diazo-compound containing one substituent in ortho-position to the diazo-group, and $R_3$ for an alkali metal atom or for a residue which is identical with the residue $R_2$, with a water-soluble substance capable of binding acids, which products form feebly colored to dark powders, dissolving in water with an acid reaction and directly reacting with the usual coupling components of azo-dyestuffs.

11. As new products the dry diazo-preparations corresponding with the general formula $$\begin{array}{c} SO_2-R_2 \\ R_1-SO_3H \\ SO_2-\text{alkali metal} \end{array}$$

wherein $R_1$ stands for the naphthalene nucleus and $R_2$ for the residue of an aromatic diazo-compound, which products form feebly colored to dark powders, dissolving in water with an acid reaction and directly reacting with the usual coupling components of azo-dyestuffs.

12. As new products a mixture of the dry diazo-preparations corresponding with the general formula $$\begin{array}{c} SO_2-R_2 \\ R_1-SO_3H \\ SO_2-\text{alkali metal} \end{array}$$

wherein $R_1$ stands for the naphthalene nucleus and $R_2$ for the residue of an aromatic diazo-compound, with a water-soluble substance capable of binding acids, which products form feebly colored to dark powders, dissolving in water with an acid reaction and directly reacting with the usual coupling components of azo-dyestuffs.

13. As new products the dry diazo-preparations corresponding with the general formula $$\begin{array}{c} SO_2-R_2 \\ R_1-SO_3H \\ SO_2-\text{alkali metal} \end{array}$$

wherein $R_1$ stands for the naphthalene nucleus and $R_2$ for the residue of an aromatic diazo-compound containing one substituent in ortho-position to the diazo-group, which products form feebly colored to dark powders, dissolving in water with an acid reaction and directly reacting with the usual coupling components of azo-dyestuffs.

14. As new products a mixture of the dry diazo-preparations corresponding with the general formula $$\begin{array}{c} SO_2-R_2 \\ R_1-SO_3H \\ SO_2-\text{alkali metal} \end{array}$$

wherein $R_1$ stands for the naphthalene nucleus and $R_2$ for the residue of an aromatic diazo-compound containing one substituent in ortho-position to the diazo-group, with a water-soluble substance capable of binding acids, which products form feebly colored to dark powders, dissolving in water with an acid reaction and directly reacting with the usual coupling components of azo-dyestuffs.

In witness whereof I have hereunto signed my name this 29th day of October, 1927.

GÉRALD BONHÔTE.